United States Patent Office 3,256,191

Patented June 14, 1966

1

3,256,191

ALKENOATE DERIVATIVES

David D. Reed, Glenham, James M. Petersen, Fishkill, and Herman D. Kluge, deceased, late of Fishkill, by Hazel E. Kluge, administratrix, Fishkill, N.Y., assignors to Texaco Inc., New York, N.Y., a corporation of Delaware No Drawing. Filed Oct. 18, 1962, Ser. No. 232,656

7 Claims. (Cl. 252—46.6)

The subject application pertains to novel reaction products of epoxyalkyl alkenoate and hydrocarbonthiophosphonic acid. More particularly, this invention is directed to hydrocarbonthiophosphonoxy-hydroxyalkyl alkenoates, hereafter known as thiophosphonoxy alkenoates, their method of manufacture and their use in lubricants.

The novel thiophosphonoxy alkenoates have demonstrated usefulness as detergent-dispersant additives for lubricating oils, and thermal stability additives for fuels, e.g., jet fuels.

The thiophosphonoxy alkenoates are represented by the formula:

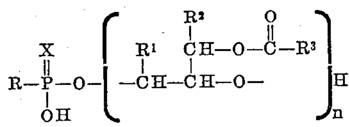

where R is a hydrocarbon derived monovalent radical, $R^1$ and $R^2$ are radicals selected from the group consisting of hydrogen and alkyl of from 1 to 6 carbons, $R^3$ is alkenyl from 2 to 20 carbons, X is a chalcogen selected from the group consisting of sulfur and a mixture of sulfur and oxygen and *n* is a value of from 1 to 2, inclusively.

The thiophosphonoxy alkenoates are formed by reacting epoxyalkyl alkenoate with a hydrocarbonthiophosphonic acid at an elevated temperature.

PREPARATION OF THE HYDROCARBONTHIOPHOSPHONIC ACID REACTANT

The hydrocarbonthiophosphonic acid reactant is derived from a hydrocarbon-$P_2S_5$ reaction product. The hydrocarbon-$P_2S_5$ reaction product is prepared by reacting aromatic hydrocarbons, cycloaliphatic hydrocarbons and aliphatic hydrocarbons with $P_2S_5$ at elevated temperature. Although a wide variety of hydrocarbons can be employed, olefins are generally used. Lubricating oil fractions and cracked hydrocarbon fractions constitute other preferred class of materials for reaction with $P_2S_5$.

The olefinic hydrocarbons reacted with $P_2S_5$ usually contain at least 12 carbon atoms although lower molecular olefins can be employed. Mono-olefin polymers such as polyisobutylene, polybutene, polypropylene and copolymers of olefins such as propylene-isobutylene copolymer are preferred materials for reaction with $P_2S_5$. In general, olefin polymers and copolymers having an average molecular weight between 250 and 50,000 are employed with polymers and copolymers having an average molecular weight in the range of 600 to 50,000 being particularly preferred. An example of a preferred olefin polymer is a polybutene polymer having an average molecular weight of 600 to 5,000.

The $P_2S_5$ is reacted with the hydrocarbon ($P_2S_5$ constituting 5 to 40 percent of the reaction mixture) at a temperature of from about 100 to 320° C. in a non-oxidizing atmosphere, for example, under a blanket of nitrogen to form a hydrocarbon-$P_2S_5$ reaction product. The hydrocarbon-$P_2S_5$ reaction product is hydrolyzed at a temperature between about 100 to 260° C. by contact with steam. The steam hydrolyzes the hydrocarbon-$P_2S_5$ reaction product to hydrocarbonthiophosphonic acid and inorganic phosphorus acids. The hydrocarbonthiophosphonic acid has the general formula:

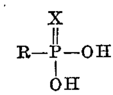

where R is a monovalent radical derived from the original charge hydrocarbon and is desirably a mono-olefinic radical containing 20 to 200 carbon atoms, and X is sulfur or a mixture of sulfur and oxygen. X in the above formula is designated as sulfur or a mixture of sulfur and oxygen because the steam hydrolysis step usually results in the replacement with oxygen of a portion of the sulfur joined to the phosphorus.

The inorganic phosphorus acids formed during hydrolysis are removed prior to reaction of the thiophosphonic acid with epoxyalkyl alkenoate. A number of different procedures are available for removal of the inorganic phosphorus acids. U.S. Patent Nos. 2,951,835 and 2,987,512 disclose the removal of inorganic phosphorus acids by contact with synthetic hydrous alkaline earth metal silicates and synthetic hydrous alkali metal silicates, respectively. Commonly-assigned, copending application Serial No. 841,668, filed September 23, 1959, now U.S. Patent No. 3,135,729, by H. D. Kluge and R. G. Lacoste, described a process wherein inorganic phosphorus acids are removed from the hydrolyzed product by extraction with anhydrous methanol

EPOXYALKYL ALKENOATE REACTANT

The epoxyalkyl alkenoates which react with the hydrocarbonthiophosphonic acid to form the novel compounds of the invention are represented by the general formula:

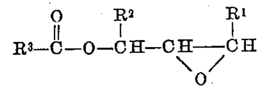

where $R^3$ is an alkenyl radical of from 2 to 20 carbons, and $R^1$ and $R^2$ are radicals selected from the group consisting of hydrogen and alkyl of from 1 to 6 carbons. Specific examples of the epoxyalkyl alkenoates contemplated herein are 2,3-epoxypropyl 2-propenoate (glycidyl acrylate); 2,3-epoxybutyl 4-hexenoate and 1-methyl-2,3-epoxypropyl 2-decenoate.

PREPARATION OF THE THIOPHOSPHONOXY ALKENOATE

The thiophosphonoxy alkenoates are prepared by reacting epoxyalkyl alkenoate with hydrocarbonthiophosphonic acid at a temperature between about 25 and 150° C. in a reactant mole ratio of thiophosphonic acid:alkenoate reactant of between about 0.1:1.0 and 2.0:1.0. The reaction is normally conducted at atmospheric pressure although superatmospheric and subatmospheric pressure may be employed. At the end of the reaction period, the product may be purified by any standard means such as fractionation. One method of fractionation is removing the unreacted reactants by stripping, e.g., with nitrogen, under reduced pressure and elevated temperature, e.g., less than 20 mm. Hg and above 90° C.

Specific examples of the thiophosphonoxy alkenoates contemplated herein are polybutene (940 M.W.) thiophosphonoxy-2-hydroxypropyl 2-propenoate; polypropylene (1500 M.W.) thiophosphonoxy-2-hydroxy-3-butylpropyl 3-hexenoate; polyisobutylene (2500 M.W.) thiophosphonoxy-1-methyl-2-hydropropyl 6-decenoate and polybutene (940 M.W.) phosphonoxy-5-acryloxymethyl-2,5-dihydroxy-4-oxahexyl-2-propenoate.

LUBRICANT COMPOSITIONS CONTAINING THE THIOPHOSPHONOXY ALKENOATE

In lubricant compositions the thiophosphonoxy alkenoates of the invention are present in the lubricating base oil in a concentration sufficient to impart detergent and dispersant properties thereto. Advantageously, in the finished lubricants the alkenoate product is usually present in a concentration between 0.2 and 10 wt. percent, desirably between 1 and 5 wt. percent. In concentrates used in the formation of the finished lubricants a concentration of thiophosphonoxy alkenoate can be as high as 50 wt. percent.

Normally the lubricant base material is mineral oil. Mineral oils can be paraffin base, naphthene base or a mixed paraffin-naphthene base distillate or residual oils. Paraffin base distillate lubricating oil fractions are used in the formulation of premium grade motor oils for which the thiophosphonoxy alkenoates are particularly suitable. The lubricating mineral oil bases contemplated herein generally have been subjected to solvent refining to improve their lubricity and viscosity-temperature relationship as well as solvent dewaxing to remove the waxy components and improve the pour of the oil. Broadly speaking, mineral oils having an SUS viscosity at 100° F. between 50 and 1,000 may be used in the formulation of improved lubricants of this invention. Usually the viscosity range falls between 70 and 300 at 100 °F.

Snytheic lubricants of the ester or ether type may also be used as the base lubricant oil. High molecular weight, high boiling liquid aliphatic dicarboxylic acid esters possess excellent viscosity-temperature relationships and lubricating properties. They are finding ever-increasing utilization in lubricating oils adapted for high and low temperature in lubrication. Esters of this type are used in the formation of the jet engine oils.

The mineral lubricating oils containing the alkenoates of the invention usually contain other additives designed to impart additional desirable properties thereto. For example, the V.I. improvers such as the polymethacrylates are normally included therein as well as corrosion inhibitors and other detergents.

A widely used V.I. improver is a polymethacrylate of the general formula:

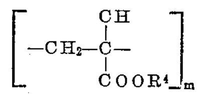

where $R^4$ is an alkyl radical of from 1 to 20 carbons and $m$ is an integer from 600 to 35,000.

A supplementary detergent which also may be utilized in the lubricant compositions of the invention is an alkaline earth metal alkylphenolate. Barium nonylphenolate, barium dodecylcresolate and calcium dodecylphenolate are examples of such detergents. These products are usually present in the lubricating oil in a concentration of between 0.1 and 5 wt. percent.

A corrosion inhibitor and anti-oxidant that can be incorporated in the lubricant compositions contemplated herein is a divalent metal dialkyl dithiophosphate resulting from the neutralization of a $P_2S_5$-alcohol reaction product with a divalent metal or a divalent metal oxide. Barium and zinc dialkyl dithiophosphates are the most widely used oxidates and metal corrosion inhibitors. Metal dialkyl dithiophosphates are usually present in the lubricant in a concentration between 0.1 and 3 wt. percent.

The following examples further illustrate the invention but are not to be construed to limitations thereof. Example I exemplifies the preparation of the hydrocarbonthiophosphonic acid reactant. Example II illustrates the preparation of the thiophosphonoxy alkenoate products of the invention. Example III illustrates the lubricant compositions of the invention and the detergent effect of the alkenoate products in lube oils.

*Example I*

A polybutene-$P_2S_5$ reaction product was prepared by reacting polybutene having an average molecular weight of about 940 with $P_2S_5$ in a mole ratio of polybutene to $P_2S_5$ of 1.1:1 and in the presence of sulfur in an amount equal to 3 wt. percent of the polybutene. After continuing the reaction at 232° C. and until the reaction mixture is soluble in n-pentane, the reactant product was diluted with approximately 150 wt. percent of a naphthene base oil having an SUS viscosity of 700 at 100° F. The diluted product was steamed at 176° F. for 10 hours in a nitrogen atmosphere and then dried by passage of nitrogen therethrough at 176° C. The steamed product was extracted with 50% aqueous methanol at 55° C. to give a methanol extract containing inorganic phosphorus acid and a lubricating oil raffinate containing polybutene (940 M.W.) of the formula:

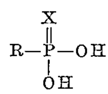

which after stripping free of methanol has a neut. No. of 22.6 and where R is a polybutene radical of an average molecular weight of 940.

The theoretical wt. percent sulfur in a thiophosphonic acid of the formula:

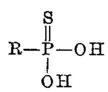

where R is as heretofore defined is 1.29. The actual sulfur found in the thiophosphonic acid product was 0.51 wt. percent indicating X is a mixture of sulfur and oxygen.

*Example II*

496 grams of the oil raffinate prepared in Example I containing 0.2 mole of polybutene (940 M.W.) thiophosphonic acid was charged to a 1 liter, 3-neck flask equipped with a stirrer, thermometer and gas inlet ube. The acid was heated to 93° C. and stirring, nitrogen blowing were begun. To the stripped, heated acid there was added 38.4 grams (0.3 mole) glycidyl acrylate and the stirring, blowing and heating was continued for a 2 hour period. At the end of the reaction period, the product was analyzed and found to be of the formula:

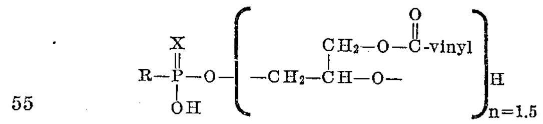

being a mixture of two compounds of the formulas:

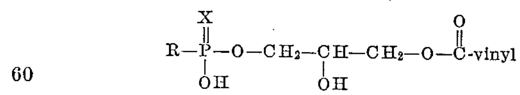

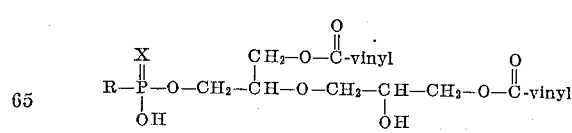

The final product analyzed as follows:

| Description | Calculated | Found |
|---|---|---|
| Phosphorus, wt. percent | 1.23 | 0.94 |
| Hydroxyl No. | 33.4 | 20 |
| Neut. No. | 0 | 0.98 |
| Mole ratio, oxide/acid reactants in products | 1.5 | 1.5 |

*Example III*

This example illustrates the lubricating detergent properties of the alkenoates contemplated herein in the lubricant base composition.

An SAE 10W-30 motor oil containing the thiophosphonoxy alkenoate product of Example II of the following formulation.

COMPOSITION A

| Description: | Concentration wt. percent |
|---|---|
| Refined paraffinic distillate Oil (SUS Visc. at 100° F.=100) | 89.70 |
| Thiophosphonoxy propenoate of Example II ($n$=1.5) | 3.02 |
| Barium $C_{12}$-alkylphenolate | 1.83 |
| Zinc isopropyl 1,3-dimethylbutyl dithiophosphate | 0.88 |
| Mineral oil concentrate containing 25 wt. percent of a copolymer of a mixed methacrylate alkyl esters in which the alkyl group range from butyl to octadecyl | 4.00 |
| $CO_2$ neutralized basic barium sulfonate | 0.57 |
| Dimethylsilicone anti-foam concentrate (p.p.m.) | 150 |

Above Composition A was tested in the CLR Sludge Engine Test together with a control oil, i.e., Composition A minus the propenoate product and the results were as follows:

CLR SLUDGE ENGINE TEST

| Hours | 38 | 54 | 70 | 94 | 110 |
|---|---|---|---|---|---|
| Description: | | | | | |
| Sludge Rating of Composition A | | 9.2 | 8.8 | 6.8 | 5.7 |
| Sludge Rating of Blank | 6.9 | 5.4 | | | |

Sludge free oil rating = 10.

As can be seen from the above, the engine oil containing propenoate takes 94 hours to accumulate sludge which the control oil accumulates in 38 hours indicating the outstanding detergent-dispersant properties of the alkenoate products of the invention.

We claim:

1. A product selected from the group consisting of thiophosphonoxy alkenoate and a mixture of said thiophosphonoxy alkenoate and corresponding phosphonoxy alkenoate, said thiophosphonoxy alkenoate of the formula:

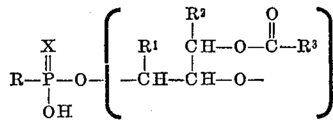

where R is hydrocarbyl derived from a polyolefin of an average molecular weight between 250 and 50,000, $R^1$ and $R^2$ are radicals selected from the group consisting of hydrogen and alkyl from 1 to 6 carbons, $R^3$ is an alkenyl radical of 2 to 20 carbons, X is sulfur and $n$ is a value from 1 to 2, inclusively, said mixture consisting of a major amount of said thiophosphonoxy alkenoate and a minor amount of said corresponding phosphonoxy alkenoate where X is oxygen.

2. A product in accordance with claim 1 wherein said product is said mixture.

3. A product in accordance with claim 1 wherein R is a polybutene derived radical of an average molecular weight of 940, $R^1$ and $R^2$ are hydrogen, $R^3$ is vinyl, $n$ is 1.5, and said product is said mixture.

4. A lubricating oil containing between 0.2 and 10 wt. percent of an additive selected from the group consisting of thiophosphonoxy alkenoate and a mixture of said thiophosphonoxy alkenoate and corresponding phosphonoxy alkenoate, said thiophosphonoxy alkenoate of the formula:

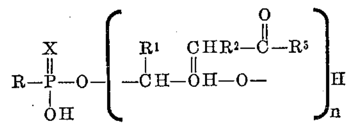

in an amount sufficient to impart detergent properties thereto where R hydrocarbyl derived from a polyolefin having an average molecular weight between 250 and 50,000, $R^1$ and $R^2$ are radicals selected from the group consisting of hydrogen and alkyl from 1 to 6 carbons, $R^3$ is an alkenyl radical having from 2 to 20 carbons, X is sulfur and $n$ is a value from 1 to 2, inclusively, said lubricating oil being a member selected from the group consisting of mineral lubricating oil, synthetic ester lubricating oil and synthetic ether lubricating oil, said mixture consisting of a major amount of said thiophosphonoxy alkenoate and a minor amount of said corresponding phosphonoxy alkenoate wherein X is oxygen.

5. A lubricating oil in accordance with claim 4 wherein said lubricating oil is a mineral lubricating oil having an SUS viscosity between 50 and 1,000.

6. A lubricant composition in accordance with claim 5 wherein $R^1$ and $R^2$ are hydrogen and said additive is said mixture.

7. A lubricant composition in accordance with claim 5 wherein R is a polyolefin derived radical having an average molecular weight of 940, $R^1$ and $R^2$ are hydrogen, $R^3$ is vinyl, $n$ is 1.5 and wherein said additive is said mixture.

References Cited by the Examiner

UNITED STATES PATENTS

| | | | |
|---|---|---|---|
| 2,652,426 | 9/1953 | Stayner | 260—461 |
| 2,683,168 | 7/1954 | Jensen et al. | 260—461 |
| 2,914,478 | 11/1959 | Neff | 252—46.6 |
| 3,123,630 | 3/1964 | Oberender et al. | 260—461 |
| 3,158,641 | 11/1964 | Reed et al. | 252—46.6 |

FOREIGN PATENTS

| | | |
|---|---|---|
| 792,553 | 3/1958 | Great Britain. |
| 838,928 | 6/1960 | Great Britain. |

DANIEL E. WYMAN, *Primary Examiner.*

L. G. XIARHOS, *Assistant Examiner.*